United States Patent
Hu et al.

(10) Patent No.: US 10,597,924 B2
(45) Date of Patent: Mar. 24, 2020

(54) SILENT SPRING HINGE

(71) Applicant: Unind (Shenzhen) Co., Limited, Shenzhen, Guangdong (CN)

(72) Inventors: Nengjun Hu, Guangdong (CN); Meiyuan Cheng, Guangdong (CN)

(73) Assignee: UNIND (SHENZHEN) CO., LIMITED, Shenzhen, Guangdong (CN)

( * ) Notice: Subject to any disclaimer, the term of this patent is extended or adjusted under 35 U.S.C. 154(b) by 0 days.

(21) Appl. No.: 16/097,787

(22) PCT Filed: May 13, 2016

(86) PCT No.: PCT/CN2016/081985
§ 371 (c)(1),
(2) Date: Oct. 30, 2018

(87) PCT Pub. No.: WO2017/193361
PCT Pub. Date: Nov. 16, 2017

(65) Prior Publication Data
US 2019/0169904 A1    Jun. 6, 2019

(51) Int. Cl.
*E05D 7/00* (2006.01)
*E05F 1/08* (2006.01)
(Continued)

(52) U.S. Cl.
CPC ............... *E05F 3/20* (2013.01); *A47J 37/06* (2013.01); *E05D 3/122* (2013.01); *E05D 11/06* (2013.01);
(Continued)

(58) Field of Classification Search
CPC .... F16F 15/03; F16F 6/00; F16F 6/005; F16F 1/1276; F16F 1/1292; F16F 1/1261;
(Continued)

(56) References Cited

U.S. PATENT DOCUMENTS 2,626,420 A  *  1/1953  Mongin ............... E05F 1/1253
                                                    16/79
3,820,866 A  *  6/1974  Kaldenberg ........ A47L 15/4261
                                                    312/276
(Continued)

FOREIGN PATENT DOCUMENTS

CN         2677532 Y      2/2005
CN       203856307 U     10/2014
(Continued)

OTHER PUBLICATIONS

International Search Report (English and Chinese) and Written Opinion issued in PCT/CN2016/081985, dated Jan. 20, 2017.

*Primary Examiner* — Chuck Y Mah
(74) *Attorney, Agent, or Firm* — Hamre, Schumann, Mueller & Larson, P.C.

(57) ABSTRACT

The present invention relates to the technical field of spring hinges, and to a silent spring hinge, which addresses the technical shortcoming that relatively high noise is generated when an existing spring hinge used in a household appliance drives a cabinet door to close. The silent spring hinge includes a fixing base, a hinge arm and a spring assembly, a damping assembly corresponding to a side edge of a rotating wheel being further provided on the fixing base, the damping assembly including a sleeve body, a steel ball, a spring and a lock nut, an outer wall of the sleeve body being snap-fitted on the fixing base, the steel ball, the spring and the lock nut being mounted within the sleeve body in sequence, a portion of the steel ball being exposed from the sleeve body and being elastically connected to the side edge of the rotating wheel, and a deceleration groove and a self-locking groove mated with the steel ball at a final stage of the process of closing a cabinet door being provided on a gear edge of the rotating wheel. By means of the present invention, the closing speed of the cabinet door is effectively reduced, and (Continued)

an effect of damping is achieved, such that the cabinet door is closed in a more stable manner, and a force of the spring assembly is not affected after the spring assembly drives the cabinet door to close. The present invention is particularly suitable for use on such products as ovens and microwave ovens.

6 Claims, 3 Drawing Sheets

(51) Int. Cl.
*E05F 3/20* (2006.01)
*A47J 37/06* (2006.01)
*E05F 1/12* (2006.01)
*E05D 11/10* (2006.01)
*E05D 3/12* (2006.01)
*E05D 11/06* (2006.01)
*E05D 3/02* (2006.01)

(52) U.S. Cl.
CPC ........ *E05D 11/1014* (2013.01); *E05F 1/1261* (2013.01); *E05D 3/02* (2013.01); *E05D 11/105* (2013.01); *E05Y 2201/21* (2013.01); *E05Y 2201/224* (2013.01); *E05Y 2201/264* (2013.01); *E05Y 2201/638* (2013.01); *E05Y 2201/71* (2013.01); *E05Y 2201/712* (2013.01); *E05Y 2600/626* (2013.01); *E05Y 2900/30* (2013.01); *E05Y 2900/308* (2013.01)

(58) Field of Classification Search
CPC ....... F16F 1/1253; F24C 15/02; F24C 15/023; E05Y 2201/41; E05Y 2201/412; E05Y 2201/414; E05Y 2201/416; E05Y 2201/40; E05Y 2201/46; E05Y 2900/30; E05Y 2900/302; E05Y 2900/304; E05Y 2900/308; E05Y 2201/21; E05Y 2201/224; E05Y 2201/71; E05Y 2201/712; E05Y 2201/716; E05Y 2201/722; E05Y 2800/102; E05Y 2800/45; E05D 11/06; E05D 11/105; E05D 11/1014; E05D 11/1064; E05D 3/18; E05D 3/122; E05F 1/1276; E05F 1/1292; E05F 1/1261; E05F 1/1253; E05F 3/02; E05F 3/10; E05F 3/20; Y10T 16/5383; A47L 15/4265

See application file for complete search history.

(56) References Cited

U.S. PATENT DOCUMENTS

| | | | | |
|---|---|---|---|---|
| 5,896,619 | A * | 4/1999 | Koopman | E05F 1/1253 16/286 |
| 7,127,778 | B2 * | 10/2006 | Salice | E05F 5/006 16/354 |
| 7,418,766 | B2 * | 9/2008 | Nelson | E05D 11/1007 16/239 |
| 8,429,795 | B2 * | 4/2013 | Huachun | A47C 17/162 16/321 |
| 9,364,132 | B2 * | 6/2016 | Gherardi | A47L 15/4261 |
| 2007/0283532 | A1 * | 12/2007 | Vanini | E05F 1/1261 16/277 |
| 2010/0109497 | A1 * | 5/2010 | Blersch | E05D 3/18 312/405 |
| 2010/0212112 | A1 * | 8/2010 | Steurer | E05F 1/1261 16/286 |
| 2010/0281650 | A1 * | 11/2010 | Kleemann | A47L 15/4261 16/64 |
| 2012/0260461 | A1 * | 10/2012 | Lautenschlager | E05D 3/14 16/352 |
| 2017/0059176 | A1 * | 3/2017 | SirLouis | F24C 15/023 |

FOREIGN PATENT DOCUMENTS

| | | | | |
|---|---|---|---|---|
| DE | 3140039 | A1 * | 4/1983 | ......... A47L 15/4261 |
| DE | 202008002407 | U1 | 5/2008 | |
| EP | 2687786 | A2 * | 1/2014 | ......... E05F 1/1276 |
| WO | 0118336 | A2 | 3/2001 | |
| WO | WO-2007107848 | A2 * | 9/2007 | ......... E05F 1/1261 |
| WO | 2014153713 | A1 | 10/2014 | |

* cited by examiner

SILENT SPRING HINGE

BACKGROUND

Technical Field

The present invention relates to the technical field of spring hinges, and in particular to a spring hinge used in household appliances that is connected between a main body and a cabinet door for assisting in elastically closing the cabinet door.

Related Art

For an existing spring hinge used in a household appliance, to ensure that a cabinet door can be satisfactorily closed and at the same time the cabinet door can be kept in an open and stationary state in the process of taking out an article from a cabinet body or placing an article in the cabinet body after the cabinet door is opened without applying an external force to the cabinet door, a spring and eccentric cam combination mechanism is generally adopted. However, for the existing spring hinge, in the process of closing the cabinet door, the cabinet door is freely closed at a relatively large acceleration under the action of a spring, relatively high noise is generated during closing of the cabinet door, and the product is greatly vibrated, which seriously affects the lifetime of the product.

Technical Problem

To sum up, an object of the present invention is to propose a silent spring hinge to address the technical shortcoming that relatively high noise is generated when an existing spring hinge used in a household appliance drives a cabinet door to close.

SUMMARY

To address the technical problem presented in the present invention, a technical solution adopted is as follows: a silent spring hinge, including a fixing base, a hinge arm and a spring assembly, the hinge arm being connected to the fixing base through a rotating wheel, and the spring assembly being mounted on the fixing base and being eccentrically and elastically connected to a wheel surface of the rotating wheel, wherein a damping assembly corresponding to a side edge of the rotating wheel is further provided on the fixing base, the damping assembly including a sleeve body, a steel ball, a spring and a lock nut, an outer wall of the sleeve body being snap-fitted on the fixing base, the steel ball, the spring and the lock nut being mounted within the sleeve body in sequence, a portion of the steel ball being exposed from the sleeve body and being elastically connected to the side edge of the rotating wheel, and a deceleration groove and a self-locking groove mated with the steel ball at a final stage of the process of closing a cabinet door being provided on a gear edge of the rotating wheel.

The rotating wheel is a first gear including gear teeth, the fixing base being connected to the first gear through a first gear shaft, a crank shaft being provided on a gear surface of the first gear, the crank shaft being movably connected to a pull rod, the spring assembly being sleeved on the pull rod, a front end of the spring assembly being mated with and snap-fitted to the fixing base; and the hinge arm includes a connecting arm and a second gear, the second gear being provided on an end of the connecting arm, the second gear and the connecting arm forming an integral structure, the second gear being connected to the fixing base through a second gear shaft, the second gear being meshed with the first gear.

The hinge arm further includes a mounting member with a mounting hole; an anti-detaching positioning groove is provided on a side edge of the connecting arm, both corners of a rear end of the connecting arm being chamfered; and a connecting arm groove for mating and snap-fitting with the connecting arm is provided on the mounting member, an elastic jaw for mating and snap-fitting with the anti-detaching positioning groove being provided on a groove wall of the connecting arm groove.

A first leaf spring structure mated and elastically clamped with the side edge of the connecting arm is provided on a side wall of the connecting arm groove, and a second leaf spring structure mated and elastically clamped with a side of the connecting arm is provided on a bottom wall of the connecting arm groove.

The spring assembly includes a bottom stopping piece, a spring and a lock nut that are sleeved on the pull rod in sequence, two raised lugs being provided on left and right sides of the bottom stopping piece respectively, and lug grooves mated with the two lugs being provided on the fixing base.

A stopping and limiting portion mated with the fixing base for position limiting is provided on the connecting arm.

Beneficial Effects

Beneficial effects of the present invention are as follows: the present invention is not only applicable to existing spring hinges in which a hinge arm and a rotating wheel are integrally formed, but also applicable to gear structure spring hinges; under the action of an elastic force of a spring assembly, after entering a final stage of the process of closing a cabinet door, mating between a deceleration groove on a rotating wheel and a damping assembly achieves an effect of deceleration and pausing, and then mating between a self-locking groove and the damping assembly achieves an effect of self-locking, thus enabling the cabinet door to be stably closed, realizing a small force of impact of the cabinet door on a main body, and effectively controlling noise generated during closing of the cabinet door.

In addition, compared to existing spring hinges, by means of a gear meshed driving mechanism of the present invention, the closing speed of the cabinet door is effectively reduced, and an effect of damping is achieved, such that the cabinet door is closed in a more stable manner, and a force of the spring assembly is not affected after the spring assembly drives the cabinet door to close. The present invention is particularly suitable for use on such products as ovens and microwave ovens.

DETAILED DESCRIPTION

Figure 1:
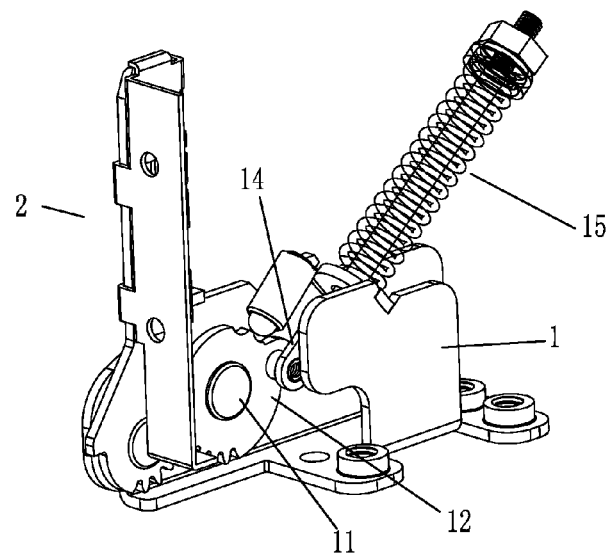
FIG. 1 is a stereoscopic schematic structural diagram I of the present invention.
Figure 2:
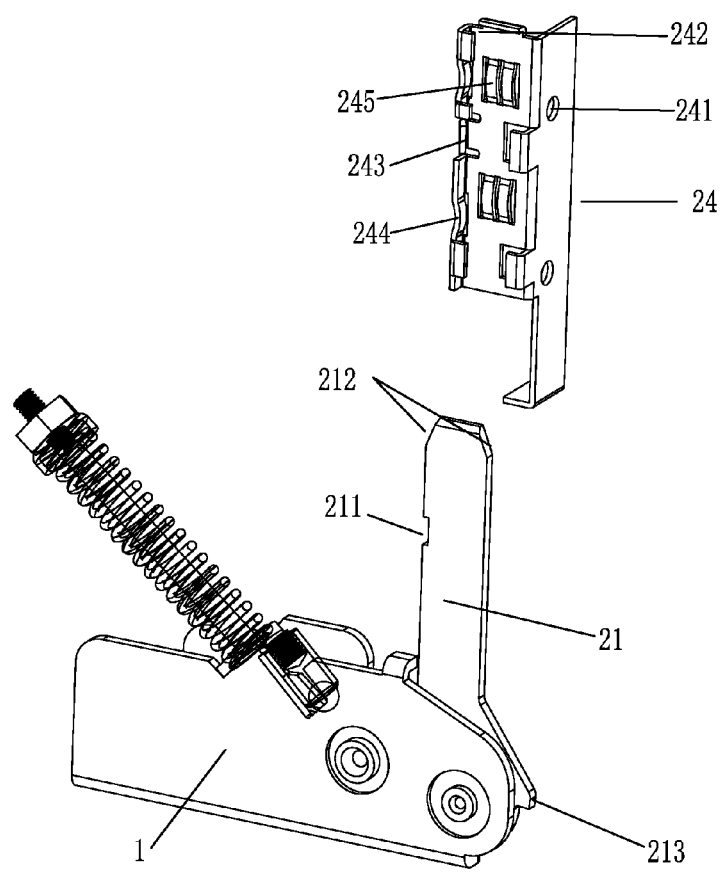
FIG. 2 is a stereoscopic schematic structural diagram II of the present invention.

A structure of the present invention is further described below in connection with the accompanying drawings and particular preferred embodiments of the present utility model.

Referring to FIGS. 1-6, as shown, a silent spring hinge of the present invention includes a fixing base 1 and a hinge arm 2. The fixing base 1 is connected to a first gear 12 through a first gear shaft 11, a crank shaft 13 being provided on a gear surface of the first gear 12, the crank shaft 13 being movably connected to a pull rod 14, a spring assembly 15 being sleeved on the pull rod 14, a front end of the spring assembly 15 being mated with and snap-fitted to the fixing base 1. The hinge arm 2 includes a connecting arm 21 and a second gear 22, the second gear 22 being provided on an end of the connecting arm 21, the second gear 22 and the connecting arm 21 forming an integral structure, the second gear 22 being connected to the fixing base 1 through a second gear shaft 23, and the second gear 22 being meshed with the first gear 12. In use, the fixing base 1 may be mounted on a main body of a household appliance, the hinge arm 2 may be mounted and connected to a cabinet door, and a pulling force may be applied to the pull rod 14 through the spring assembly 15. The pulling force drives the first gear 12 to rotate, and the first gear 12, through the second gear 22 meshed therewith, drives the hinge arm 2 to flip with the second gear shaft 23 as a fulcrum, thus driving the cabinet door to automatically close, with an elastic force retained. When the door is opened under the action of an external force, the hinge arm 2 is driven by the cabinet door to oppositely flip, and the first gear 12 is reversely rotated, thus compressing a spring through the pull rod 14. In order to keep the cabinet door in an open state, after the crank shaft 13 on the gear surface of the first gear 12 passes through a point furthest from the spring assembly 15, the cabinet door is deprived of an acting force for closing the door, thus keeping it in the open state. To achieve an effect of positioning after the cabinet door is opened to a largest extent, a stopping and limiting portion 213 mated with the fixing base 1 for position limiting is provided on the connecting arm 21.

Figure 5:
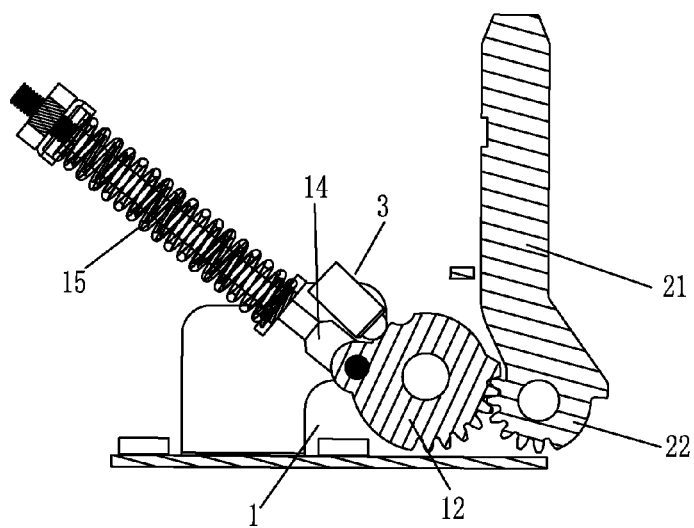
FIG. 5 is a schematic structural diagram of the present invention in a closed state.
Figure 6:
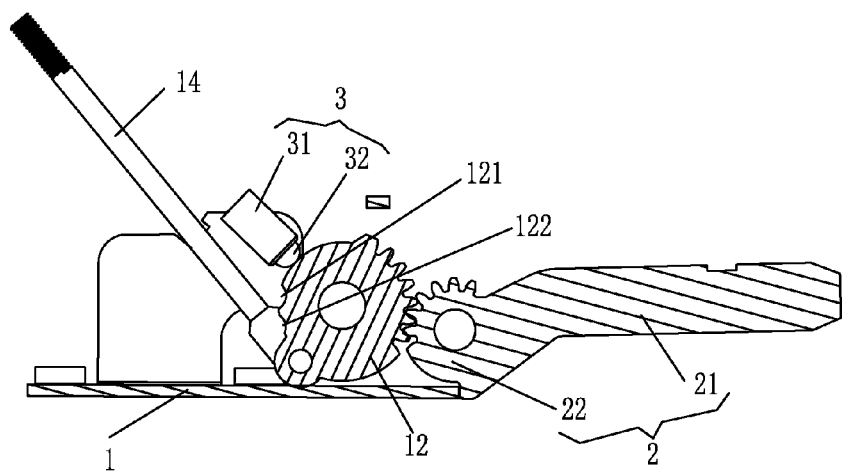
FIG. 6 is a schematic structural diagram of the present invention in an open state.

Referring to FIG. 5 and FIG. 6, as shown, a damping assembly 3 is further provided on the fixing base 1. The damping assembly 3 acts on the first gear 12 and is configured to weaken a force of impact exerted on the main body of the household appliance in the process of closing the cabinet door, thus reducing noise generated during closing of the door and improving the grade of the product. At the same time, the cabinet door is self-locked after completely closed.

A particular structure is as follows: the damping assembly 3 includes a sleeve body 31, a steel ball 32, a spring and a lock nut. An outer wall of the sleeve body 31 is snap-fitted on the fixing base 1. The steel ball 32, the spring and the lock nut are mounted within the sleeve body 31 in sequence, a portion of the steel ball 32 being exposed from the sleeve body. In addition to gear teeth mated and meshed with the second gear 22, the first gear 12 further includes a deceleration groove 121 and a self-locking groove 122 configured to be mated with the steel ball 32 of the damping assembly 3. In the process of closing the cabinet door, after entering a final stage of the closing process, the first gear 12 rotates at a relatively fast speed until the deceleration groove 121 is engaged with the steel ball 32. When the steel ball 32 climbs up from the deceleration groove 121, a resistance of the first gear 12 increases, so the first gear 12 slows down, so does the cabinet door. The first gear 12 continues rotating, and after the steel ball climbs out of the deceleration groove 121, the resistance decreases, and the cabinet door is closed under the action of the elastic force of the spring assembly 15. When the cabinet door is completely closed, the self-locking groove 122 continues being rotated with the first gear 12 to a position for interfacing with the exposed portion of the steel ball 32. The steel ball 32 enters the self-locking groove 122 and comes into elastic connection with the groove, thereby achieving an effect of self-locking, increasing a resistance at the moment of opening the door, and enabling more satisfactory closing of the cabinet door.

Figure 3:
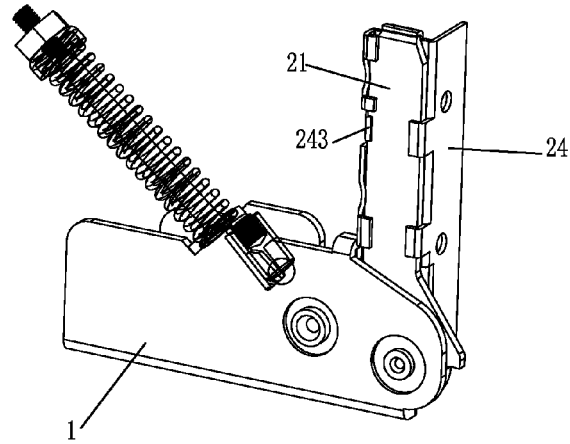
FIG. 3 is a schematic structural diagram prior to assembling of a mounting member with a connecting arm of the present invention.
Figure 4:
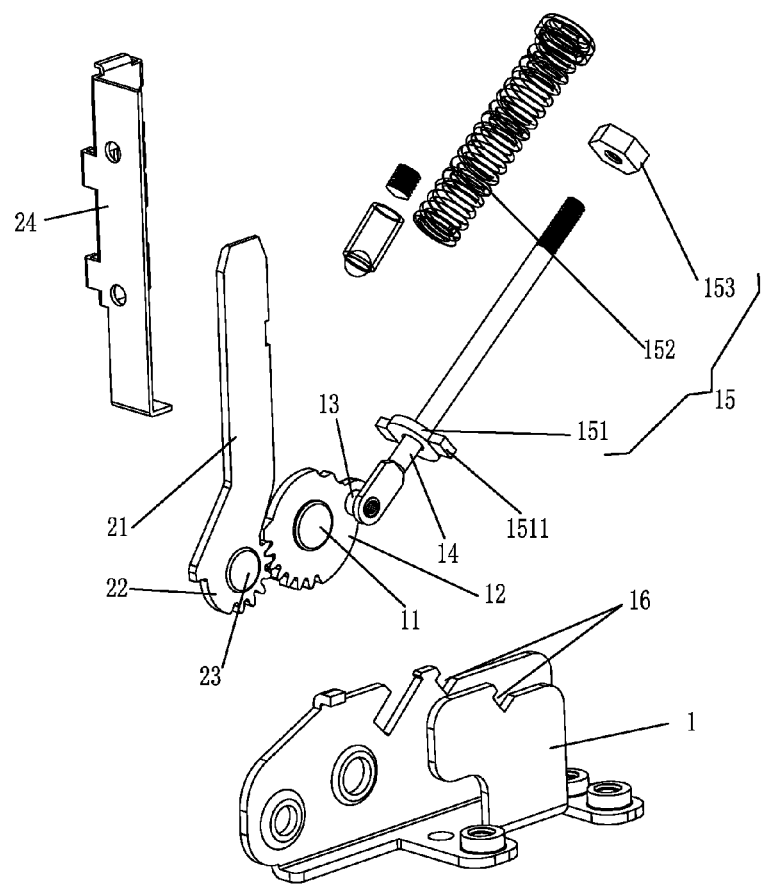
FIG. 4 is an exploded schematic structural diagram of the present invention.

Referring to FIG. 3, as shown, in order to facilitate mounting and use of the present invention, the hinge arm 2 further includes a mounting member 24 with a mounting hole 241. An anti-detaching positioning groove 211 is provided on a side edge of the connecting arm 21. Both corners 212 of a rear end of the connecting arm 21 are chamfered. A connecting arm groove 242 for mating and snap-fitting with the connecting arm 21 is provided on the mounting member 24, an elastic jaw 243 for mating and snap-fitting with the anti-detaching positioning groove 211 being provided on a groove wall of the connecting arm groove 242. During mounting and use, the mounting member 24 may be firstly fixed within a frame of the cabinet door through a screw. When the rear end of the connecting arm 21 is inserted into the connecting arm groove 242 of the mounting member 24, the elastic jaw 243 is elastically deformed under the action of both chamfered corners 212 on the rear end of the connecting arm 21. After the connecting arm is inserted in position, the elastic jaw 243 is snapped in the anti-detaching positioning groove 211 to prevent the connecting arm 21 from being detached from the mounting member 24.

In order to prevent the connecting arm 21 from being loosened from the mounting member 24, a first leaf spring structure 244 mated and elastically clamped with the side edge of the connecting arm 21 is provided on a side wall of the connecting arm groove 242, and a second leaf spring structure 245 mated and elastically clamped with a side of the connecting arm 21 is provided on a bottom wall of the connecting arm groove 242.

The spring assembly 15 includes a bottom stopping piece 151, a spring 152 and a lock nut 153 that are sleeved on the pull rod 14 in sequence. Protruded lugs 1511 are respectively provided on left and right sides of the bottom stopping piece 151. Lug grooves 16 mated with the two lugs are provided on the fixing base 1.

What is claimed is:

1. A silent spring hinge for a cabinet door, comprising:
   a fixing base;
   a hinge arm; and
   a spring assembly, the hinge arm being rotatably connected to the fixing base and being engaged with a rotating wheel mounted on the fixing base, and the spring assembly being mounted on the fixing base and being eccentrically and elastically connected to a wheel surface of the rotating wheel,
   wherein a damping assembly corresponding to an edge of the rotating wheel is further provided on the fixing base, the damping assembly comprising a sleeve body, a steel ball, a spring and a lock nut, an outer wall of the sleeve body being snap-fitted on the fixing base, the steel ball, the spring and the lock nut being mounted within the sleeve body in sequence, a portion of the steel ball being exposed from the sleeve body and being elastically in contact with the edge of the rotating wheel, and a deceleration groove and a self-locking groove, provided on the edge of the rotating wheel, being successively in contact with the steel ball at a final stage of the process of closing the cabinet door.

2. The silent spring hinge of claim 1, wherein the rotating wheel is a first gear including gear teeth, the fixing base being connected to the first gear through a first gear shaft, a crank shaft being provided on a gear surface of the first gear, the crank shaft being pivotally connected to a pull rod, the spring assembly being sleeved on the pull rod, a front end of the spring assembly being mated with and snap-fitted to the fixing base; and the hinge arm comprises a connecting arm and a second gear, the second gear being provided on an end of the connecting arm, the second gear and the connecting arm forming an integral structure, the second gear being connected to the fixing base through a second gear shaft, the second gear being meshed with the first gear.

3. The silent spring hinge of claim 2, wherein the hinge arm further comprises a mounting member with a mounting hole; an anti-detaching positioning groove is provided on a side edge of the connecting arm, both corners of a rear end of the connecting arm being chamfered; and a connecting arm groove for mating and snap-fitting with the connecting arm is provided on the mounting member, an elastic jaw for mating and snap-fitting with the anti-detaching positioning groove being provided on a groove wall of the connecting arm groove.

4. The silent spring hinge of claim 3, wherein a first leaf spring structure mated and elastically clamped with the side edge of the connecting arm is provided on a side wall of the connecting arm groove, and a second leaf spring structure mated and elastically clamped with a side of the connecting arm is provided on a bottom wall of the connecting arm groove.

5. The silent spring hinge of claim 2, wherein the spring assembly comprises a bottom stopping piece, a spring and a lock nut that are sleeved on the pull rod in sequence, two raised lugs being provided on a first side and a second side of the bottom stopping piece respectively, and lug grooves mated with the two lugs being provided on the fixing base.

6. The silent spring hinge of claim 1, wherein a stopping and limiting portion mated with the fixing base for position limiting is provided on the connecting arm.

* * * * *